(12) United States Patent
Fenyves et al.

(10) Patent No.: US 11,407,378 B2
(45) Date of Patent: Aug. 9, 2022

(54) AIRBAG SYSTEM AND RELATED METHODS OF INFLATING AN AIRBAG

(71) Applicants: Andras Fenyves, Brooklyn, NY (US); Christopher Swatta, Annapolis, MD (US)

(72) Inventors: Andras Fenyves, Brooklyn, NY (US); Christopher Swatta, Annapolis, MD (US)

(*) Notice: Subject to any disclaimer, the term of this patent is extended or adjusted under 35 U.S.C. 154(b) by 136 days.

(21) Appl. No.: 16/822,974

(22) Filed: Mar. 18, 2020

(65) Prior Publication Data
US 2020/0298789 A1 Sep. 24, 2020

Related U.S. Application Data

(60) Provisional application No. 62/819,983, filed on Mar. 18, 2019.

(51) Int. Cl.
*B60R 21/264* (2006.01)
*B60R 21/33* (2006.01)
*B60R 21/237* (2006.01)

(52) U.S. Cl.
CPC ............ *B60R 21/264* (2013.01); *B60R 21/33* (2013.01); *B60R 21/237* (2013.01)

(58) Field of Classification Search
CPC .............. B60R 21/264; B60R 21/2646; B60R 2021/01006; B60R 2021/26017; B60R 2021/26041; B60R 2021/26047; B60R 2021/2642
See application file for complete search history.

(56) References Cited

U.S. PATENT DOCUMENTS

| | | | | |
|---|---|---|---|---|
| 3,606,377 A | * | 9/1971 | Martin | B60R 21/16 280/741 |
| 3,776,570 A | * | 12/1973 | Weman | B60R 21/23 280/738 |
| 3,778,084 A | * | 12/1973 | Sutherland | B60R 21/264 280/741 |

(Continued)

FOREIGN PATENT DOCUMENTS

| | | | |
|---|---|---|---|
| DE | 41 16 882 | 12/1992 | ............. B60R 21/22 |
| EP | 2298594 | 3/2011 | |

(Continued)

OTHER PUBLICATIONS

Australian Patent Office, Patent Examination Report No. 1 from corresponding Australian patent application, dated Oct. 18, 2016, 4 pgs.

(Continued)

*Primary Examiner* — Barry Gooden, Jr.
(74) *Attorney, Agent, or Firm* — Hayes Soloway P.C.

(57) ABSTRACT

An airbag system and related method of inflating an airbag is disclosed. The airbag system has an airbag cushion having an interior cavity. At least one pyrotechnic gas generating compound is positioned within the interior cavity of the airbag cushion. At least one ignition source is in communication with the at least one pyrotechnic gas generating compound. A control unit is in communication with the at least one ignition source, wherein activation of the at least one ignition source by the control unit causes the at least one pyrotechnic gas generating compound to inflate the airbag cushion.

17 Claims, 11 Drawing Sheets

(56) References Cited

U.S. PATENT DOCUMENTS

| | | | |
|---|---|---|---|
| 3,904,221 A | 9/1975 | Shiki et al. ................. 280/150 |
| 3,930,667 A | 1/1976 | Osuchowski ........ A41D 13/018 |
| 4,299,406 A | 11/1981 | Thomas ................. B62J 27/00 |
| 4,685,151 A | 8/1987 | Kincheloe |
| 4,825,469 A | 5/1989 | Kincheloe ............ A41D 13/018 |
| 4,826,223 A | 5/1989 | Geringer et al. ..... E05C 19/168 |
| 5,024,159 A * | 6/1991 | Walley .................... C06B 45/12 |
| | | | 102/289 |
| 5,066,039 A * | 11/1991 | Shitanoki ................ B60R 21/01 |
| | | | 280/743.1 |
| 5,104,727 A | 4/1992 | Wnenchak ................... 428/285 |
| 5,273,313 A * | 12/1993 | Klober .................... C06D 5/06 |
| | | | 149/19.2 |
| 5,348,344 A * | 9/1994 | Blumenthal .......... B60R 21/017 |
| | | | 222/3 |
| 5,351,619 A * | 10/1994 | Chan .................. B60R 21/2644 |
| | | | 102/289 |
| 5,460,407 A * | 10/1995 | Stuckle ............... B60R 21/2644 |
| | | | 102/201 |
| 5,495,807 A * | 3/1996 | Klober ............... B60R 21/2646 |
| | | | 102/289 |
| 5,518,807 A * | 5/1996 | Chan ....................... C06B 45/14 |
| | | | 428/305.5 |
| 5,580,086 A * | 12/1996 | McAlister ............... B60R 21/20 |
| | | | 280/737 |
| 5,660,413 A * | 8/1997 | Bergerson ............. B60R 21/264 |
| | | | 102/201 |
| 5,713,595 A * | 2/1998 | Mooney ................ B60R 21/264 |
| | | | 102/202.5 |
| 5,746,442 A | 5/1998 | Hoyaukin ............ A41D 13/018 |
| 5,763,820 A * | 6/1998 | Philpot ............... B60R 21/2644 |
| | | | 102/282 |
| 5,781,936 A | 7/1998 | Alaloof ................ A41D 13/018 |
| 6,007,090 A | 12/1999 | Hosono et al. |
| 6,062,143 A * | 5/2000 | Grace ...................... C06D 5/06 |
| | | | 102/530 |
| 6,129,380 A * | 10/2000 | Rink ..................... B60R 21/264 |
| | | | 280/735 |
| 6,176,517 B1 * | 1/2001 | Hamilton .............. B60R 21/272 |
| | | | 280/736 |
| 6,298,789 B1 * | 10/2001 | Ericsson ............... B60R 21/264 |
| | | | 102/530 |
| 6,425,934 B1 * | 7/2002 | Aoki ........................ B09B 5/00 |
| | | | 75/10.1 |
| RE37,843 E * | 9/2002 | Blumenthal .......... B60R 21/017 |
| | | | 222/3 |
| 6,467,414 B1 | 10/2002 | Fisher ....................... 102/202.4 |
| 6,499,404 B1 * | 12/2002 | Kern ....................... F42B 3/113 |
| | | | 102/201 |
| 6,543,054 B2 | 4/2003 | Gabriel .................. A41D 11/00 |
| 6,859,939 B1 | 3/2005 | Osburn, Sr. ........... A41D 13/018 |
| 7,401,364 B2 | 7/2008 | Goto ..................... A41D 13/018 |
| 9,550,472 B2 * | 1/2017 | Johanson .............. B60R 21/264 |
| 9,622,520 B2 | 4/2017 | Fenyves ................ A41D 13/018 |
| 2002/0092088 A1 | 7/2002 | Duhamell ............ A41D 13/018 |
| 2003/0222438 A1 | 12/2003 | Nagatsuyu |
| 2004/0232678 A1 * | 11/2004 | Smith .................. C06B 21/0083 |
| | | | 280/741 |
| 2007/0102907 A1 | 5/2007 | Bowers ................... B60R 21/16 |
| 2007/0151640 A1 * | 7/2007 | Hussey .................... C06D 5/06 |
| | | | 149/2 |
| 2009/0019623 A1 | 1/2009 | Uchida |
| 2011/0154561 A1 | 6/2011 | Singhal ................ A41D 13/018 |
| 2014/0047623 A1 | 2/2014 | Richards .............. A41D 13/018 |
| 2014/0048422 A1 * | 2/2014 | Johanson .............. B60R 21/264 |
| | | | 205/555 |
| 2014/0123374 A1 | 5/2014 | Gelston ................ A41D 13/018 |
| 2015/0266264 A1 * | 9/2015 | Lowe .................... B60R 21/264 |
| | | | 280/741 |
| 2015/0321637 A1 * | 11/2015 | Lowe .................... B60R 21/235 |
| | | | 280/741 |
| 2015/0343975 A1 | 12/2015 | Schnetger et al. ...... B60R 21/01 |
| 2016/0000158 A1 | 1/2016 | Davis ..................... A63B 69/18 |

FOREIGN PATENT DOCUMENTS

| | | | |
|---|---|---|---|
| FR | 345275 | 11/1904 | ............... A62B 1/14 |
| WO | WO98/11793 | 3/1998 | |

OTHER PUBLICATIONS

Canadian Intellectual Property Office, Office Action from corresponding Canadian patent application, dated Jul. 8, 2016, 3 pgs.

European Patent Office, Supplementary European Search Report from corresponding European patent application dated Oct. 10, 2016, 6 pgs.

International Search Report and Written Opinion issued in PCT/US20/23379 dated Jun. 25, 2020, 11 pgs.

* cited by examiner

AIRBAG SYSTEM AND RELATED METHODS OF INFLATING AN AIRBAG

CROSS REFERENCE TO RELATED APPLICATION

This application claims benefit of U.S. Provisional Application Ser. No. 62/819,983 entitled, "Airbag integrated inflator" filed Mar. 18, 2019, the entire disclosure of which is incorporated herein by reference.

FIELD OF THE DISCLOSURE

The present disclosure is generally related to airbags and more particularly is related to an airbag system and related methods of inflating an airbag.

BACKGROUND OF THE DISCLOSURE

Airbags are widely used in the transportation industry to absorb the force of impacts on human beings during accidents, crashes, or other situations where injuries can occur due to rapid decelerations or changes in momentum. With automobiles, airbags are positioned in various locations within the cabin, such as on the steering wheel, by the side curtain, on the doors, or other locations. When an accident or other situation with the potential to injure the human occupants is sensed, these airbags are rapidly inflated to occupy a position where the human being is likely to be forced, such that the airbag can absorb the force of the movement.

FIG. 1 is a cross-sectional illustration of an airbag, in accordance with the prior art. As shown, the airbag 10 includes an airbag cushion 12 which is positioned within an airbag compartment 14. Inflation of the airbags is commonly achieved with a pyrotechnic device 16 which is positioned outside of the airbag compartment but near the airbag cushion 12. When the pyrotechnic device 16 is ignited, the pyrotechnic substance generates a gas which is directed into the airbag cushion 12 to inflate it. Commonly the pyrotechnic device is housed within a thick, metal housing 18, which is desirable to ensure that the force of the exploding pyrotechnic substance and the resulting gas is directed into the airbag cushion 12 to inflate it rapidly.

However, this thick metal housing 18 of the pyrotechnic device 16 has drawbacks, as these metal housings can add a considerable amount of weight and size to the overall airbag device. For example, the pyrotechnic substance itself is typically about 50 g-100 g while the metal housing can be 500 g-1000 g in weight. This size and weight can limit where the airbag can be positioned within a vehicle, which in turn, can limit its effectiveness. For instance, vehicles with small interiors, e.g., ATVs or motorcycles, may not have the spatial room for airbags in certain locations, which can result in a vehicle having less-than-optimal safety features. Additionally, there are a variety of non-traditional settings which would benefit from the use of airbags, but they haven't been incorporated due to the weight and size requirements. For example, motorcycles, bicycles, horses, ATVs, or other settings could experience a sudden deceleration or fall or collision with another object or person which could possibly cause injury to the object or human or animal. Incorporating airbags into these environments is desirable and would help decrease injuries.

Thus, a heretofore unaddressed need exists in the industry to address the aforementioned deficiencies and inadequacies.

SUMMARY OF THE DISCLOSURE

Embodiments of the present disclosure provide an airbag system and related methods of inflating an airbag. Briefly described, in architecture, one embodiment of the system, among others, can be implemented as follows. The airbag system has an airbag cushion having an interior cavity. At least one pyrotechnic gas generating compound is positioned within the interior cavity of the airbag cushion. At least one ignition source is in communication with the at least one pyrotechnic gas generating compound. A control unit is in communication with the at least one ignition source, wherein activation of the at least one ignition source by the control unit causes the at least one pyrotechnic gas generating compound to inflate the airbag cushion.

The present disclosure can also be viewed as providing an airbag system having an airbag cushion with an interior cavity. At least one pyrotechnic gas generating compound is positioned within the interior cavity of the airbag cushion. At least one electric circuit board is positioned within the interior cavity of the airbag cushion, wherein the at least one pyrotechnic gas generating compound is positioned in close proximity to the at least one electric circuit board. At least one ignition source is in communication with the at least one electric circuit board. A control unit is in communication with the at least one ignition source, wherein activation of the at least one ignition source by the control unit causes ignition of the at least one pyrotechnic gas generating compound, whereby the airbag cushion is inflated.

The present disclosure can also be viewed as providing methods of inflating an airbag. In this regard, one embodiment of such a method, among others, can be broadly summarized by the following steps: providing an airbag cushion having an interior cavity and at least one pyrotechnic gas generating compound positioned within the interior cavity of the airbag cushion; positioning at least one electric circuit board within the interior cavity of the airbag cushion, wherein the at least one pyrotechnic gas generating compound is in close proximity to the one electric circuit board; and activating at least one ignition source in communication with the at least one electric circuit board with a control unit, whereby the at least one pyrotechnic gas generating compound is ignited and the airbag cushion is inflated.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve over the shortcomings of conventional airbags, the subject disclosure is directed to an integrated inflatable protection device or airbag which has an inflator incorporated into the interior cavity of the airbag cushion itself. Enclosing the pyrotechnic gas generator and igniter within the airbag cushion is different than what conventionally exists, since conventional airbag systems have a separate pyrotechnic gas generator which is housed within its own metal housing together with the igniter, filters and other parts and is attached to the airbag cushion from the outside. Locating the inflator within the airbag cushion eliminates the need for a separate pyrotechnic gas inflator structure for the inflation of an airbag, thereby reducing its size and weight. In turn, this allows for the use of airbag technology in vehicles or situations when weight and size are limiting the use of traditional non-integrated airbag technology.

For example, conventional airbags cannot be used in situations where the airbag is attached to the human body due, in part, to the excess weight of a heavy and bulky metal gas inflator. The airbag system disclosed herein may be used by mounting it on any moving or stationary object or moving or stationary person such as car, motorcycle, bicycle, horse, human, pet animals, other animals, hang glider, hot air balloon basket, airplane or others, where an accident, a sudden deceleration, or fall or collision with another object or person would possibly cause injury to the object or human or animal and protection with an airbag is desirable, or in any situation when a rapid inflation of a bag is desirable. Expanding the use of airbags is one benefit of the subject disclosure, among others which are described with reference to the figures.

Figure 2:
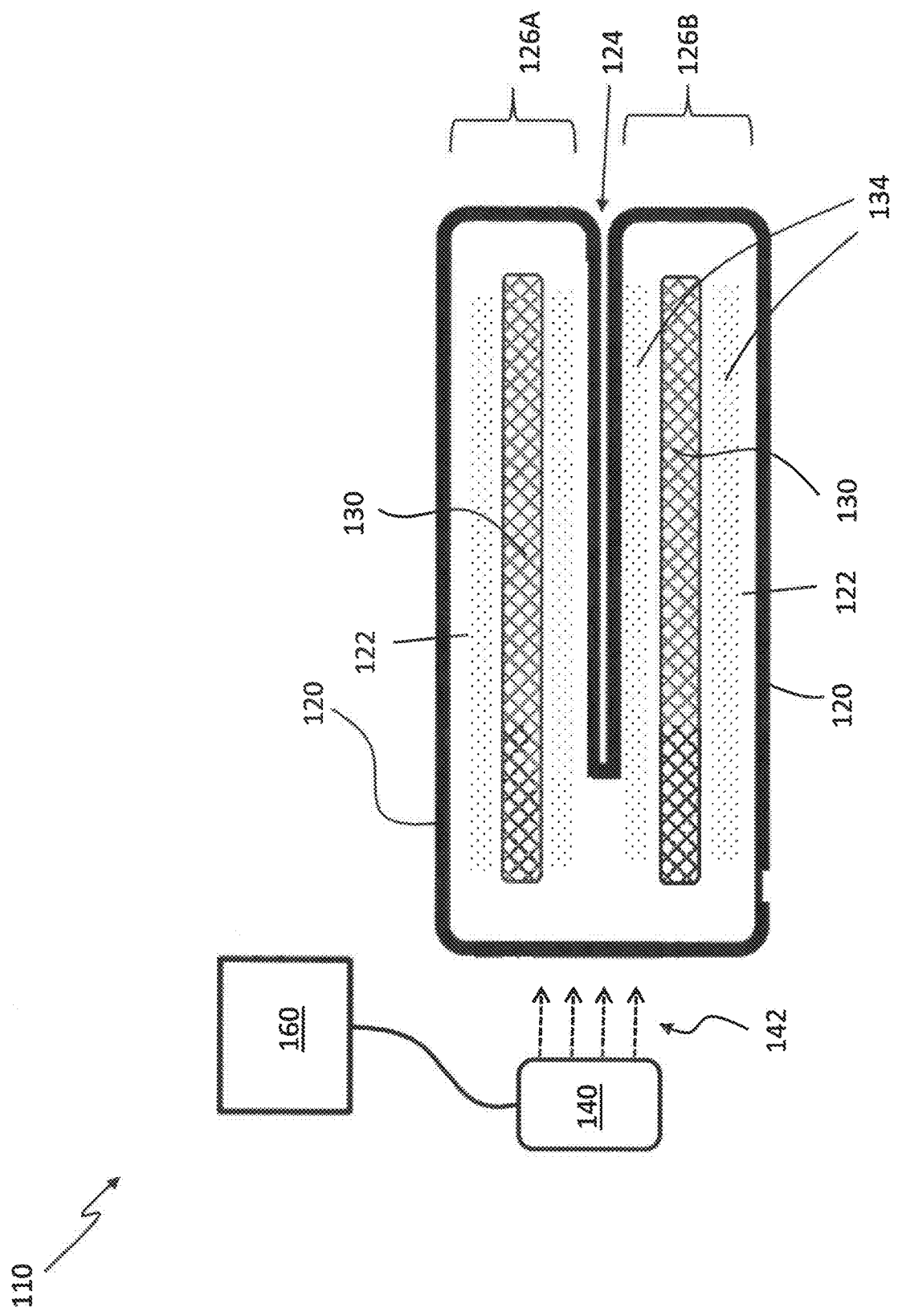
FIG. 2 is a diagrammatical, cross-sectional illustration of an airbag system, in accordance with a first exemplary embodiment of the present disclosure.

FIG. 2 is a diagrammatical, cross-sectional illustration of an airbag system 110, in accordance with a first exemplary embodiment of the present disclosure. The airbag system 110 includes an airbag cushion 120 having an interior cavity 122. The airbag cushion 120 is generally characterized as an inflatable structure formed from one or more materials which are flexible or fabric-like. The airbag cushion 120 may have a variety of sizes and shapes, either when deflated or when inflated. As shown in FIG. 2, the airbag cushion 120 has a central folded region 124 which extends from a first side of the airbag cushion 120 towards the opposing side, but which ceases prior to contacting the opposing side. The central folded region partially separates the interior cavity 122 into two portions 126A, 126B. The folded position of the airbag cushion 120 fabric, as shown in FIG. 2, may allow the gas generation to take place with the most efficiency and least damage to the integrity of the airbag cushion 120 fabric.

At least one pyrotechnic gas generating compound 130 is positioned within the interior cavity 122 of the airbag cushion 120 and placed within one of the two portions 126A, 126B. In the first exemplary embodiment, two portions of the pyrotechnic gas generating compound 130 may be used, with a first portion positioned on one side of the central folded region 124 in the first portion 126A, and a second portion of the pyrotechnic gas generating compound 130 positioned on a substantially opposite side of the central folded region 124 in the second portion 126B. In this arrangement, the pyrotechnic gas generating compound 130 is positioned substantially parallel to the central folded region 124. It may be desirable for the pyrotechnic gas generating compound 130 to be shaped in a form and strategically placed within the airbag cushion cavity folds, such that when ignited, the gas can distribute properly and with minimal reactive thrust. The pyrotechnic gas generating compound 130 may include various pyrotechnic ignition mixes or various primary explosives which generate gas when ignited. In one example, the pyrotechnic gas generating compound 130 is formed as thin sheets or substantially flat, planar structures which are positioned substantially parallel to the central folded region 124.

While the materials forming the pyrotechnic gas generating compound 130 may vary, depending on the design of the airbag system 110, one particular example of the pyrotechnic gas generating compound 130 was formed from a mixture of a dry powder mixture of 6.13 g of ammonium nitrate, 2 g of silver nitrotetrazole and 1.87 g of 5-aminotetrazole (anhydrous). Therefore, the proportion of approximately 61.3% ammonium nitrate, 20% silver nitrotetrazole and 18.7% 5-amino-tetrazole (anhydrous) was used. This pyrotechnic gas generating compound 130 was evenly spread over a circular area of 616 cm$^2$ (a 14 cm$^2$ radius circle). A high voltage spark gap electronic initiator with 0.015 g of silver nitrotetrazole placed in between the high voltage electrodes was used to ignite the explosive sheet. The electricity was conducted to the spark gap via 5 mm wide 0.025 mm thick copper foil tapes. Both the pyrotechnic gas generating compound 130 and the copper foil tape were mounted on a thin polyethylene sheet. The spark gap initiator together with the silver nitrotetrazole was placed in the center of the circularly placed thin layer of pyrotechnic gas generating compound 130. Upon application of high voltage, the silver nitrotetrazole detonated and initiated a detonation in the entirety of the thin circularly shaped pyrotechnic ignition mix within the airbag cushion 120 fabric.

At least one ignition source 140 is in communication with the pyrotechnic gas generating compound 130. The ignition source 140 may include various different types of igniters or combinations of igniters. For example, the ignition source 140 may include an electric ignition source, a heat-generating ignition source, a vibration ignition source, and/or a laser ignition source, all of which are represented schematically in FIG. 2. The connection or communication between the ignition source 140 and the pyrotechnic gas generating compound 130 or the airbag cushion 120 may vary depending on the specific ignition source 140 used. For example, an electric ignition source may transmit an electric signal or current to the pyrotechnic gas generating compound 130, or other structures located nearby. Similarly, the heat-generating ignition source may communicate a quantity of heat to the pyrotechnic gas generating compound 130, the vibration ignition source may transmit a physical or mechanical vibration to the pyrotechnic gas generating compound 130, and the laser ignition source may communicate a quantity of light to the pyrotechnic gas generating compound 130. Various physical devices or arrangements may be used to communicate the ignition, such as electrical wires, thermal connectors, fiber optical cables, and/or physical contact, all of which are represented at 142 schematically in FIG. 2.

A control unit 160 is in communication with the at least one ignition source 140. The control unit 160 may be an electronic device, a computerized device, or another type of electro-mechanical device capable of controlling ignition of the ignition source 140. The control unit 160 may control the timing and/or functionality of the ignition sources 140 via a wired or wireless communication medium. For example, for automobiles, the control unit 160 may be a computerized device which utilizes sensors positioned within the vehicle to monitor for forces which warrant airbag deployment. The control unit 160 may be in electrical communication with the ignition source 140, such that it can send an appropriate activation signal to the ignition source 140 to ignite it, either directly or indirectly, or to perform another function. Once the ignition source is ignited, it detonates or deflagrates to cause the pyrotechnic gas generating compound 130 to generate a gas which inflates the airbag cushion 120.

Figure 3:
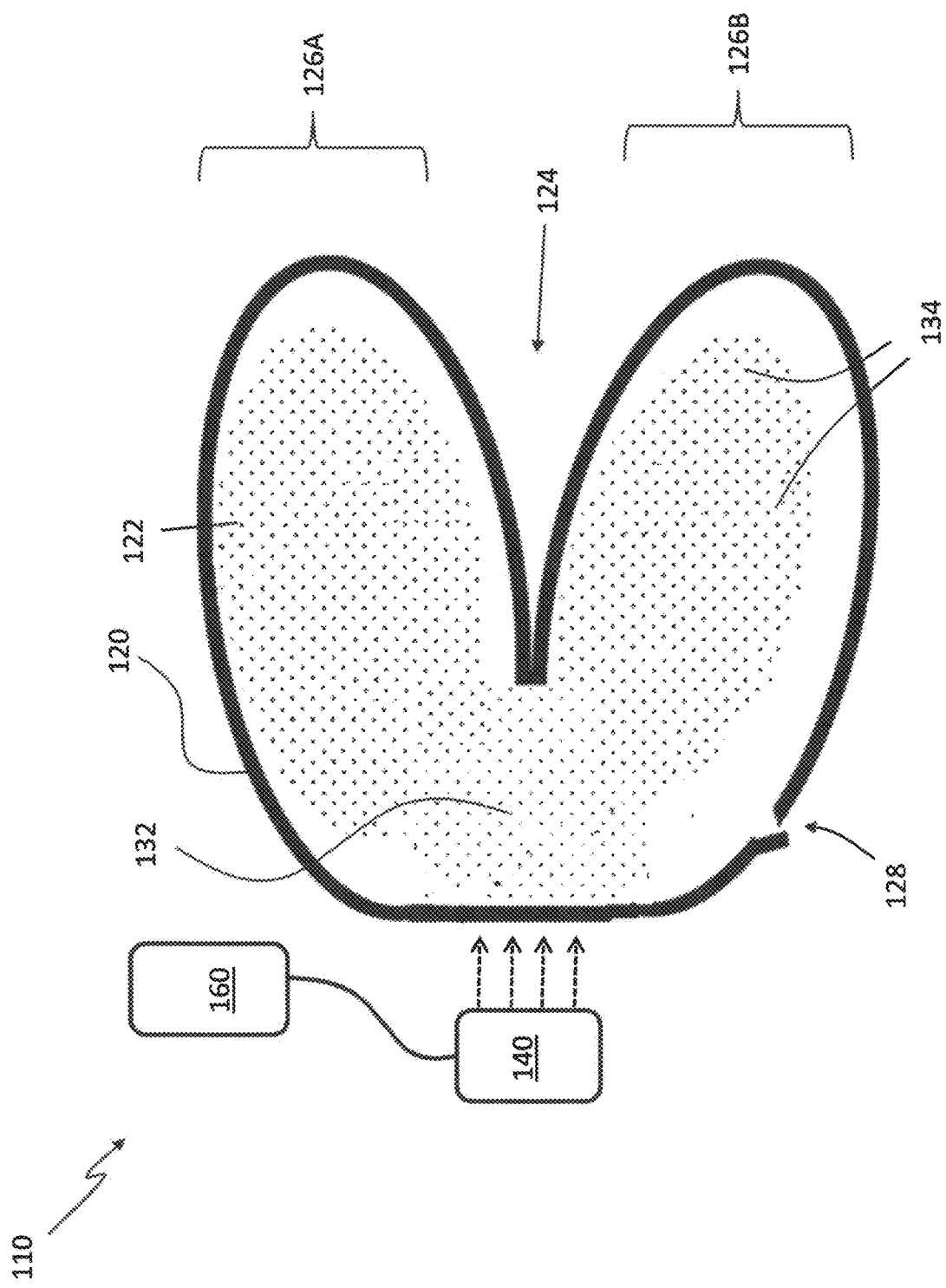
FIG. 3 is a diagrammatical, cross-sectional illustration of the airbag system of FIG. 2, in accordance with the first exemplary embodiment of the present disclosure.
Figure 4:
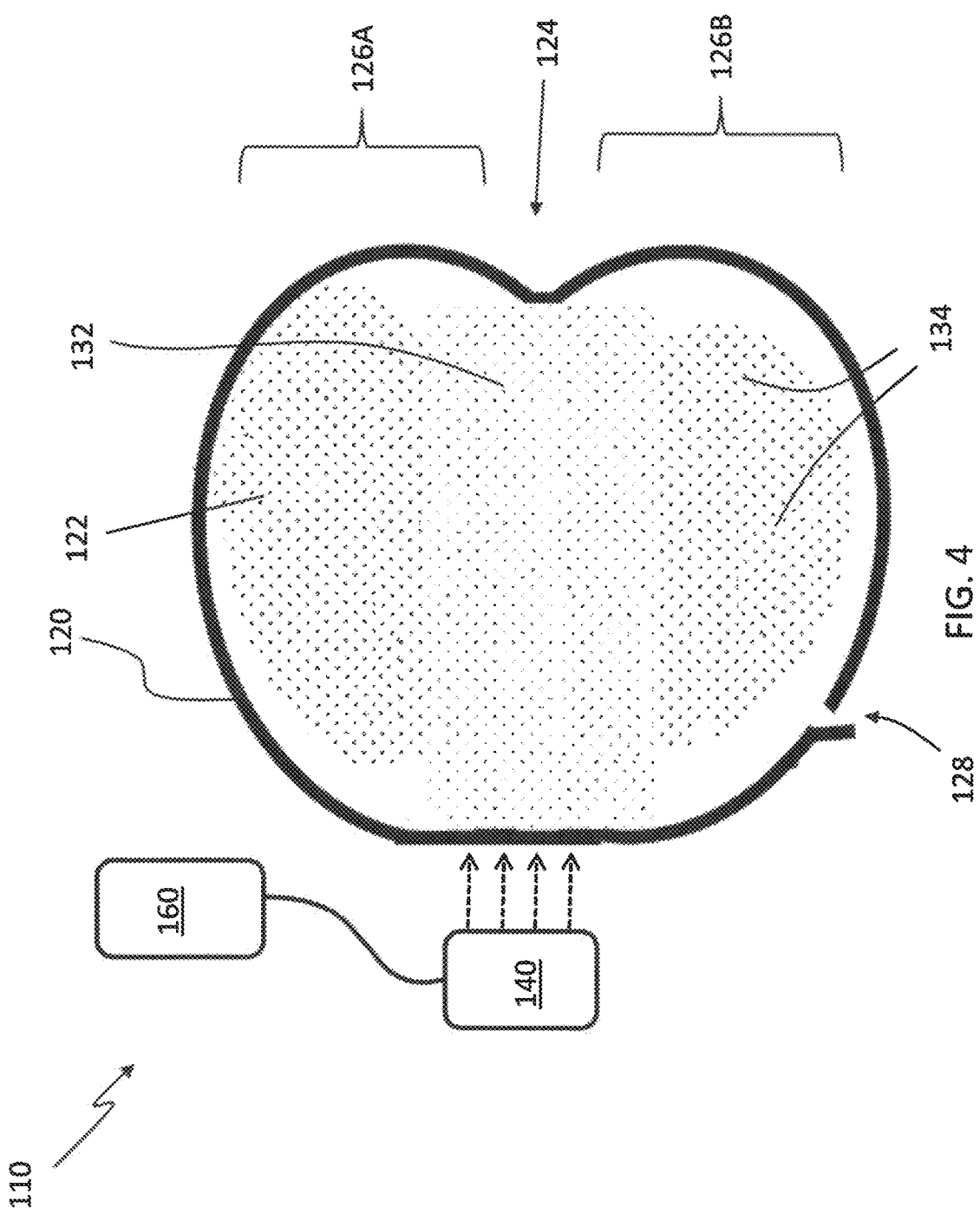
FIG. 4 is a diagrammatical, cross-sectional illustration of the airbag system of FIGS. 2-3, in accordance with the first exemplary embodiment of the present disclosure.

FIG. 3 is a diagrammatical, cross-sectional illustration of the airbag system 110 of FIG. 2, in accordance with the first exemplary embodiment of the present disclosure, and FIG. 4 is a diagrammatical, cross-sectional illustration of the airbag system 110 of FIGS. 2-3, in accordance with the first exemplary embodiment of the present disclosure. In particular, FIGS. 3-4 diagrammatically illustrate different phases of inflation of the airbag cushion 120 after the pyrotechnic gas generating compound 130 was detonated and gas was generated within the cavity of the airbag cushion 120. As can be seen in FIG. 3, when the pyrotechnic gas generating compound 130 is initially ignited, gas 132 is created which fills the interior cavity 122 of the airbag cushion 120. This causes the central folded region 124 to separate, such that portions 126A and 126B are moved away from one another as the airbag material forming the central folded region 124 is pushed outwards. As shown in FIG. 4, the gas 132 may substantially fill the interior cavity 122 of the airbag cushion 120, such that the central folded region 124 is greatly minimized or eliminated. The eventual shape of the airbag cushion 120 may vary, depending on design, but it many cases it may have a substantially spherical or spheroid shape.

While inflation occurs, a pressure relief structure 128 may start to open. The pressure relief structure 128 may be optionally included, and may include various types of structures, such as valves or small openings in the airbag cushion 120, which allows for regulation of the inflation pressure in the airbag cushion 120 during and after the inflation action. For example, the pressure relief structure 128 may be small enough to ensure the gas 132 fills or substantially fills the interior cavity 122, yet allow some or all of the gas to escape the interior cavity 122 after a certain period of time to fully or partially deflate the airbag cushion 120. The amount of time for the airbag cushion 120 to remain inflated may commonly be just long enough to prevent injury during an accident.

As shown in FIGS. 2-4, the interior cavity 122 of the airbag cushion 120 may include a heat absorbing powder 134, or heat dispersing powder, which is positioned near the pyrotechnic gas generating compound 130. The heat absorbing powder 134 may be used to lower the temperature of the expanding gas 132 when the pyrotechnic gas generating compound 130 is ignited. In one example, the heat absorbing powder 134 may be a graphite powder, however other materials may also be used.

Figure 1:
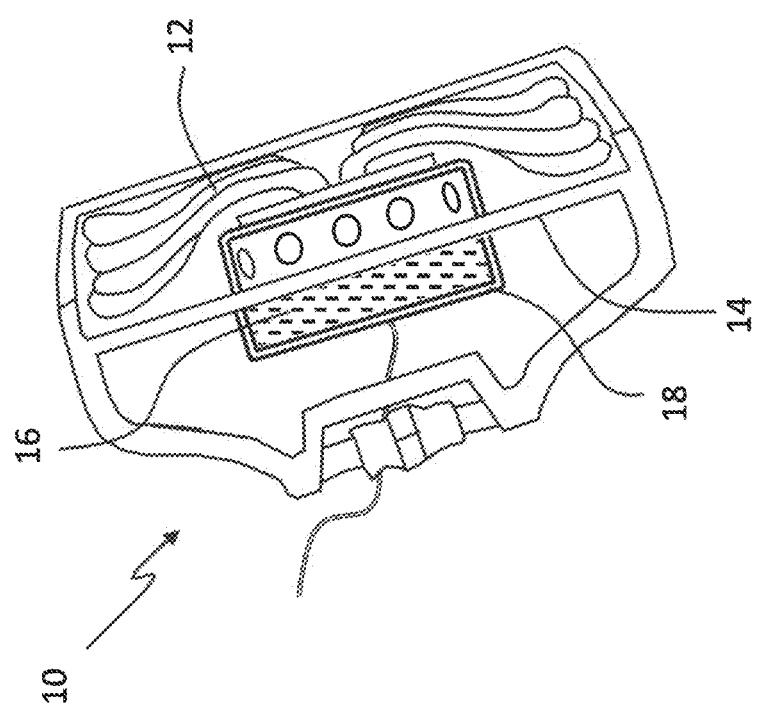
FIG. 1 is a cross-sectional illustration of an airbag, in accordance with the prior art.
Figure 5:
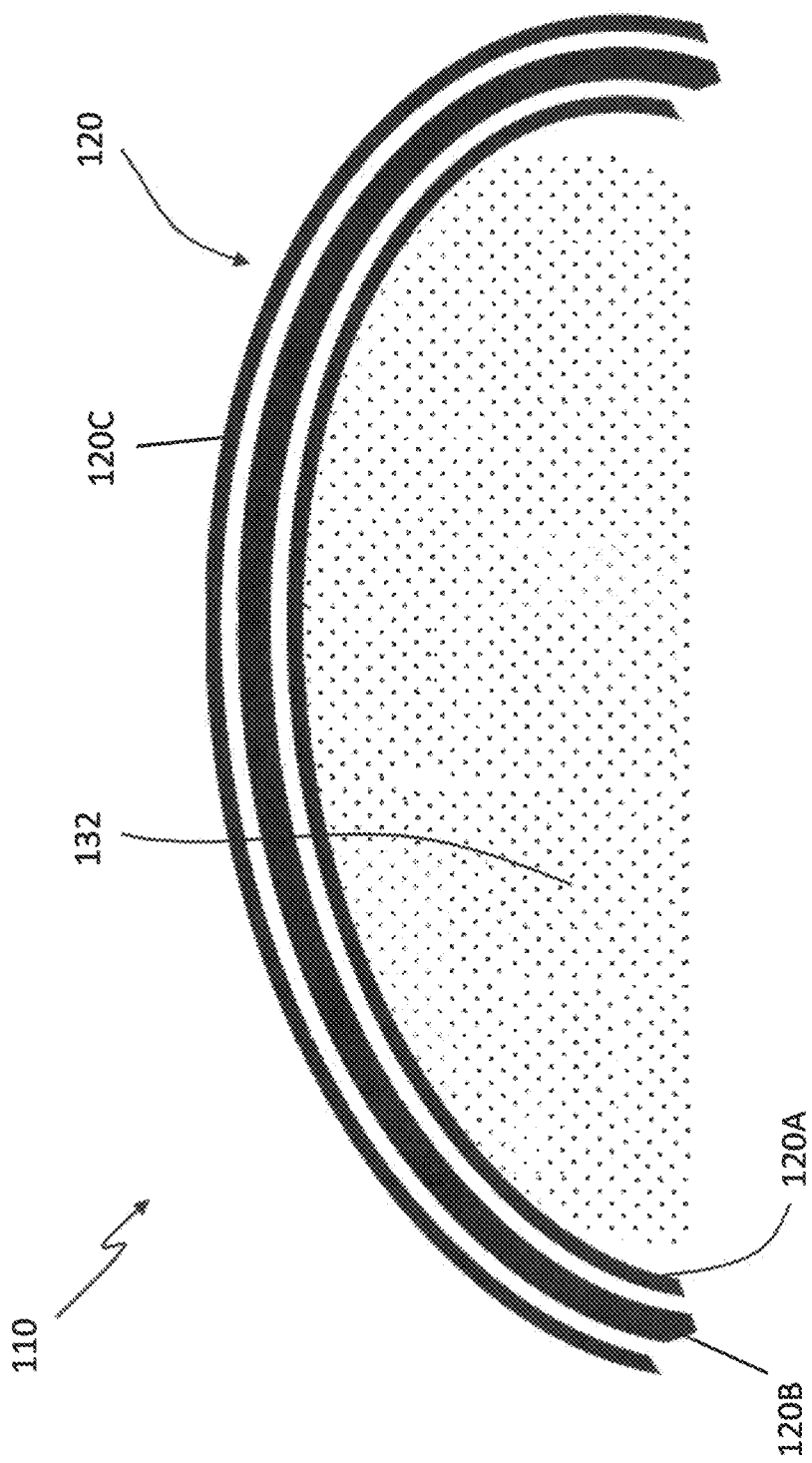
FIG. 5 is a diagrammatical, cross-sectional illustration of the airbag system of FIG. 1, in accordance with the first exemplary embodiment of the present disclosure.

FIG. 5 is a diagrammatical, cross-sectional illustration of the airbag system 110 of FIG. 1, in accordance with the first exemplary embodiment of the present disclosure. FIG. 5 illustrates exemplary components which form the airbag cushion 120. It is desired for the airbag cushion 120 fabric to be made of a material that is strong and heat resistant enough to withstand the mechanical force and temperature of the expanding gas. In some situations, a multilayered airbag cushion 120 fabric may be used, where a heat resistant layer of fabric is combined with layers of fabric that possess high tensile strength and possibly another layer that provides for proper level of gas permeability, in a sandwiched multilayer fashion. As shown in FIG. 5, the layers which form the wall or fabric of the airbag cushion 120 may include an inner layer 120A formed from a heat-resistant material, such as a high-temperature resistant thermal insulating fiberglass fabric, for instance, a vermiculite-coated fiberglass fabric. This heat-resistant material of the inner layer 120A may allow the airbag cushion 120 to maintain its integrity despite elevated temperature from the ignition of the pyrotechnic gas generating compound 130. The middle layer 120B may be a low gas permeability material, such as a nylon which prevents gas 132 from escaping the airbag cushion 120 through the fabric itself. The outer layer 120C may be a high tensile strength material, such as a high tensile strength nylon which can add structural durability to the airbag cushion 120 and contact with the human being when the airbag system 110 is deployed.

As can be understood, the present disclosure can be used to eliminate the conventional heavy and bulky metal housing used in current airbag modules by incorporating the pyrotechnic gas generating compound 130 directly into the airbag cushion 120. This may eliminate upwards of 500 g-1,000 g in weight from the lack of the metal housing, and also lessen the spatial requirements of the airbag, which in turn, allows for it to be used in more settings. Additionally, it is also noted that the present disclosure recognizes that spreading the explosion of the pyrotechnic gas generating compound 130 over a larger area of the airbag fabric may decrease its explosive impact on the fabric, which maintains the integrity of the airbag fabric and lessen the chances of a rupture in the airbag fabric throughout the explosion. Certain mixes of pyrotechnic gas generating compounds 130 can be detonated if constructed in a thin sheet layer and ignited in one or more areas while the detonation or deflagration can spread to the entirety of the thin explosive sheet, and thus spread evenly throughout the interior cavity 122 of the airbag cushion 120.

Figure 6:
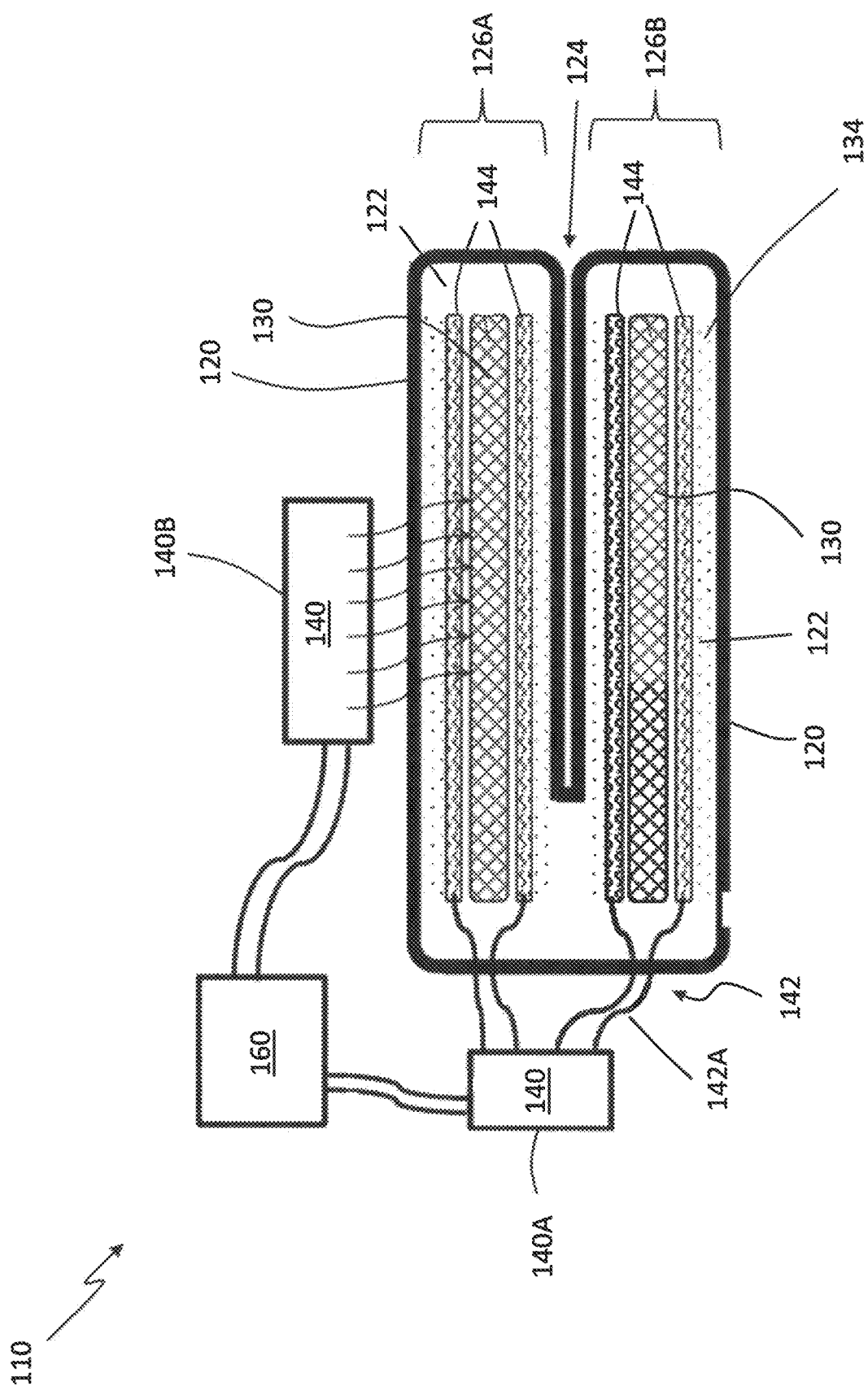
FIG. 6 is a diagrammatical, cross-sectional illustration of the airbag system, in accordance with the first exemplary embodiment of the present disclosure.
Figure 7:
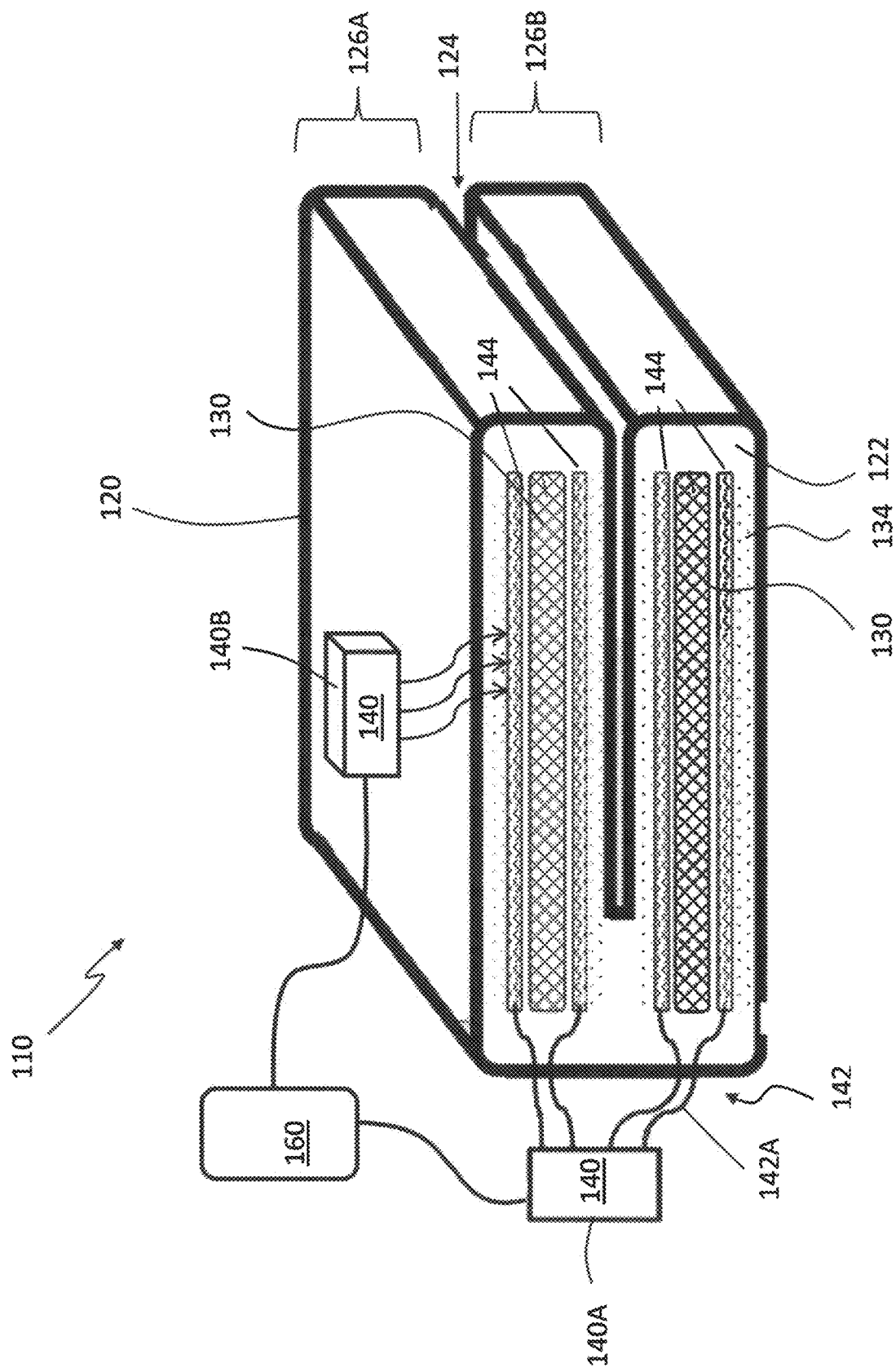
FIG. 7 is a diagrammatical, cross-sectional, plan view illustration of the airbag system, in accordance with the first exemplary embodiment of the present disclosure.

The airbag system 110 described relative to FIGS. 2-5 diagrammatically illustrates the use of one or more ignition sources 140, while FIGS. 6-7 provide a more specific example of the airbag system 110 ignition. FIG. 6 is a diagrammatical, cross-sectional illustration of the airbag system 110 and FIG. 7 is a diagrammatical, cross-sectional, plan view illustration of the airbag system 110, both in accordance with the first exemplary embodiment of the present disclosure. In particular, FIGS. 6-7 illustrate the airbag system 110 being used with an ignition source 140 located at least partially within the interior cavity 122 of the airbag cushion 120 itself. As shown, the ignition source 140 includes one or more electric circuit boards 144 within the inner cavity 122 in a position which substantially abuts, sandwiches, is in close proximate to, or very close proximity to, or is immediately near or next to the pyrotechnic gas generating compound 130. For example, the one or more electric circuit boards 144 may be substantially touching the pyrotechnic gas generating compound 130, or it may be positioned a only a few millimeters or centimeters from the pyrotechnic gas generating compound 130. The one or more electric circuit boards 144 may be connected to a source for ignition, which in FIGS. 6-7 is an electrical ignition source 140A which supplies or generates electric power and transmits a current through wires 142A to the electric circuit boards 144. Each of the pyrotechnic gas generating compounds 130, if more than one is present, may have one or more electric circuit boards 144 positioned near it.

The electric circuit board 144 may be sheets or a sheet which contain multiple electrical circuits in a circuit board fashion, thereby allowing flow of electricity to multiple regions of the electric circuit board 144 sheet. The electric circuit board 144 sheets may be connected via wires 142A to the electrical ignition source 140A, which are guided through one or more small openings in the airbag cushion 120. The electrical ignition source 140A may include an electronic heat unit that generates electrical current high enough to either heat the electric circuit board 144 sheets directly by rapidly heating a properly sized resistant wire or foil, or the electrical ignition source 140A may transmit an electrical current which produces electric sparks or electric are discharges in between the two electric circuit board 144 sheets or between multiple areas of a single electric circuit board 144 sheet. The electric sparks or electric arc discharges may occur between different points of each electric circuit board 144 sheet to ignite the pyrotechnic gas generating compound 130 positioned therebetween.

Accordingly, it is possible for only one electric circuit board 144 to be used, whereby electric sparks or arcs discharges occur between different parts of the same board, and this single electric circuit board 144 may be flat or shaped otherwise. For example, the single electric circuit board 144 may have a curved or bend portion, or may be substantially U-shaped, such that part of the electric circuit board 144 is positionable proximate to two different sides of the pyrotechnic gas generating compound 130, such as when a U-shaped board is positionable on either planar side of the pyrotechnic gas generating compound 130. Two or more electric circuit boards 144 may also be used, where the electric spark or electric arc discharge is transmitted between two separate boards. For clarity in disclosure, FIGS. 6-7 diagrammatically illustrate the use of two electric circuit boards 144 in each region 126A, 126B, but the use of only one electric circuit board 144 is contemplated and envisioned.

The electric circuit boards 144 used with the electric ignition source 140A may preferably be a flat, thin sheet, but other shapes may be used. Also preferably, the igniter may be shaped to conform to the shape of the pyrotechnic gas generating compound 130, thereby allowing it to ignite the compound in multiple areas at the same time, due in part to a high matching surface area between the electric circuit boards 144 and the pyrotechnic gas generating compound 130.

In one example, the electric circuit boards 144 may be produced from compressed soft cellulose and multistring copper wire where the strands are very thin allowing easy disintegration into small pieces during an explosion. In another example, the electric circuit boards 144 may be constructed from thin polyethylene sheets with thin, adhesive laced metallic foil, such as a copper foil, to construct the electric circuit board 144 and standard insulated stranded copper wire to connect the electric circuit board 144. When detonated, the electric circuit board 144 produced no significantly large pieces of shrapnel that would have threatened the integrity of the airbag cushion 120 fabric.

Figure 8A:
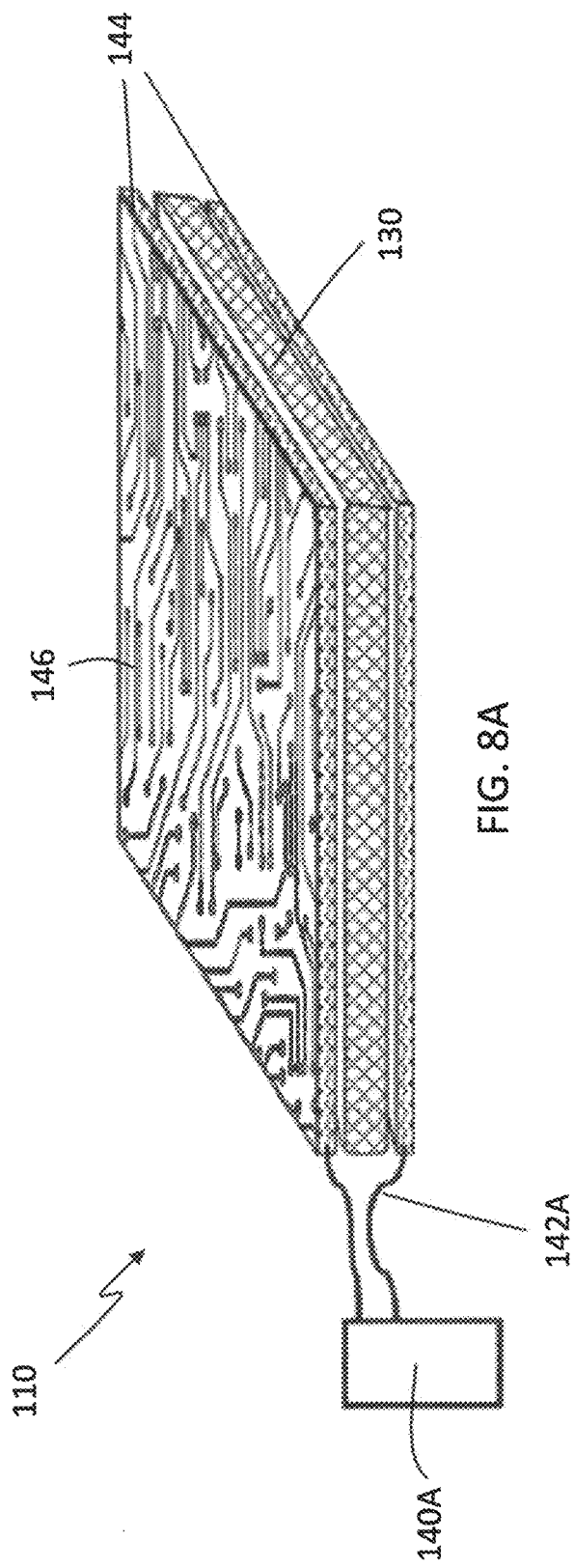
FIGS. 8A-8B are diagrammatical, cross-sectional illustrations of electric circuit boards used with the airbag system, in accordance with the first exemplary embodiment of the present disclosure.
Figure 8B:
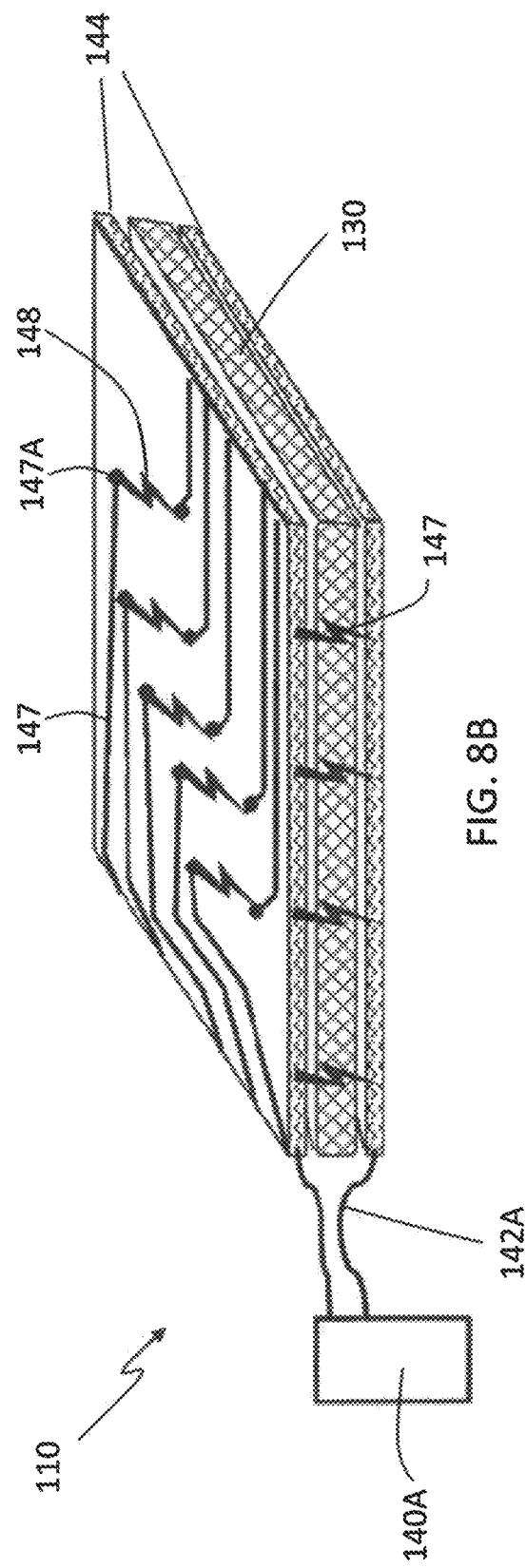

FIGS. 8A-8B illustrate examples of ignition using the electric circuit boards 144. Specifically, FIG. 8A is a three-dimensional rendering of two electric circuit board 144 sheets positioned sandwiching the pyrotechnic gas generating compound 130. Each of the electric circuit board 144 sheets may include resistant wires or foil 146, such as, for example, nichrome or other rapidly heating element. As an electric current is supplied from the electric ignition source 140A through wires 142A, the electric current flows through the resistant wires or foil 146 which causes them to heat rapidly. This rapid thermal change heats the pyrogenic compound directly, or the added pyrotechnic ignition mixes or various primary explosives which may be included in the pyrotechnic gas generating compound 130, due to its proximate location to the electric circuit boards 144, which in turn, causes ignition of the pyrotechnic gas generating compound 130. In an alternative arrangement, a heating element may be formed in the shape of a sheet allowing a large surface area to substantially match that of the pyrotechnic gas generating compound 130.

FIG. 8B illustrates an example where ignition is based on electric arcs. Here, an electric current is supplied from the electric ignition source 140A through wires 142A and into one or more of the electric circuit boards 144. The electric signal from the electrical ignition source 140A reaches the electric circuit board 144 sheet that has multiple electronically conductive but insulated tracks 147. Electric arcs are formed between the uninsulated tips 147A of the electronically conductive tracks 147 on the same electric circuit board 144 and between two opposing electric circuit boards 144 which sandwich the pyrotechnic gas generating compound 130. The uninsulated tips 147A are spaced to allow for a properly sized spark gap. These electric arcs or discharges 148 ignite the pyrotechnic gas generating compound 130.

An alternative ignition source may include using an electronically connected laser diode to directly initiate an explosion. Accordingly, instead of electrically conductive wires 142A, one or more optical wire may be used to direct laser light to the pyrotechnic gas generating compound 130 to ignite the pyrotechnic gas generating compound 130. The laser diode may generate a laser pulse upon a properly constructed pyrotechnic gas generating compound 130 mix mounted on a substrate, or mixed into the explosive sheet to initiate a detonation or deflagration.

Yet another ignition source 140 may include a vibration ignition source 140B, as illustrated in FIGS. 6-7. The vibration ignition source 140B may generate a vibration in the sonic or ultrasonic range, and this vibration propagates through the wall of the airbag cushion 120 fabric and all of its components, reaching the pyrotechnic gas generating compound 130. The vibrations shake the pyrotechnic gas generating compound 130 and this vibration causes it to ignite. The vibration ignition source 140B may be strategically placed on the outside of the airbag cushion 120 fabric, touching the folded fabric, either directly or indirectly. One of the benefits of the vibration ignition source 140B is the ability to limit possible shrapnel-producing materials within the interior cavity 122, since the vibration ignition source 140B does not require circuitry, wires, or other components positioned within the interior cavity 122.

It is noted that two or more different types of ignition sources 140 may be used concurrently, which can aid in successful ignition of the pyrotechnic gas generating compound 130. For example, at the same time as the electronic control unit 160 sends an electric signal via wires to the electric ignition source 140A, the control unit 160 may send an electric signal to the vibration ignition source 140B. This may result in the pyrotechnic gas generating compound 130 being ignited by both the electric ignition source 140A and the vibrations from the vibration ignition source 140B. Thus, the sole effect of the heat and/or spark from the electric ignition source 140A, or the sole effect of the vibration from the vibration ignition source 140B, or the combination of the electric ignition source 140A and the vibration ignition source 140B may detonate the pyrotechnic gas generating compound 130, resulting in the release of rapidly expanding gas that inflates the airbag cushion 120. During detonation of the pyrotechnic gas generating compound 130, the electric circuit board 144, any wires, and any other materials within the interior cavity 122 are pulverized. The heat absorbing powder 134 made of graphite powder, or another material, decreases heat exposure to the airbag fabric.

Figure 9:
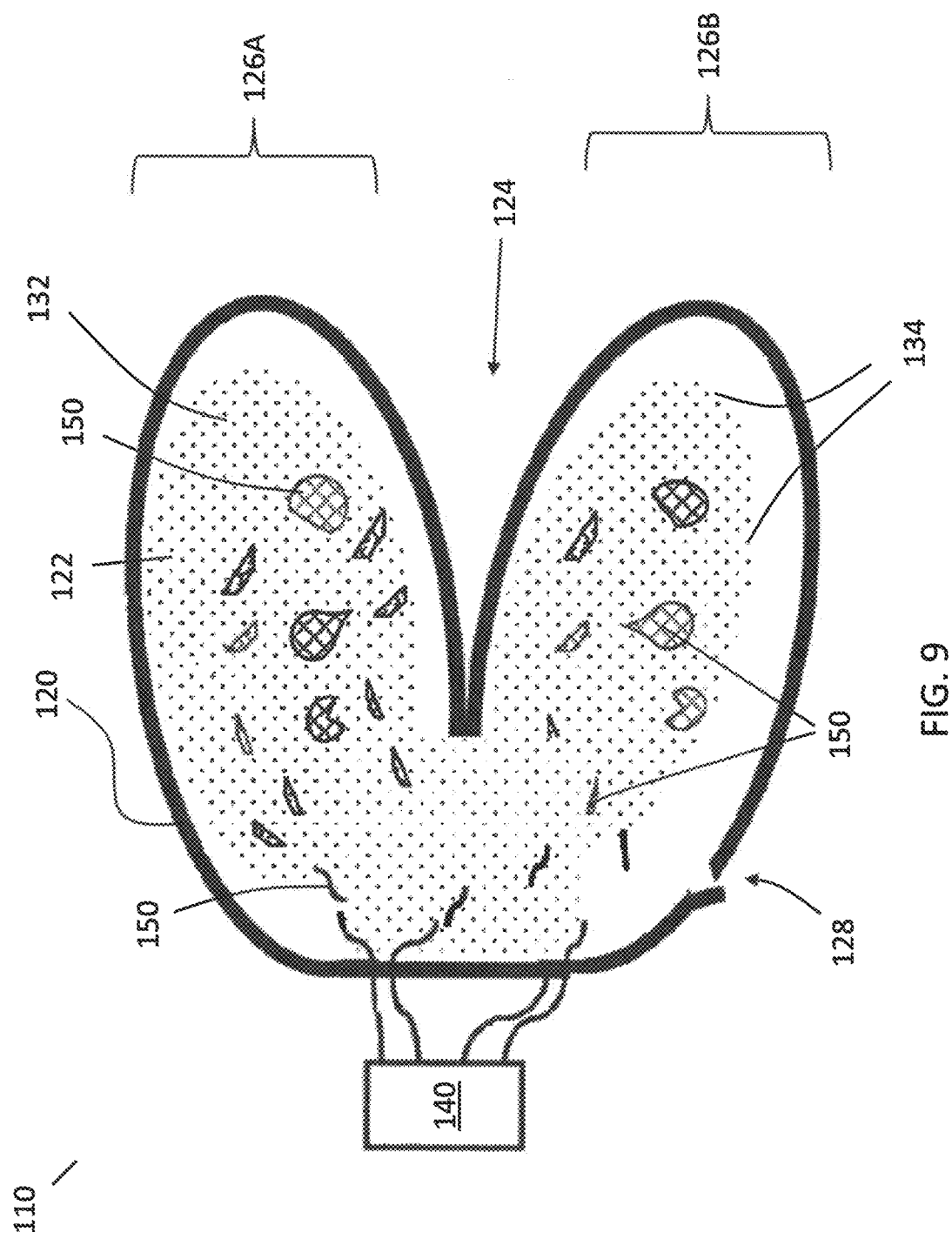
FIG. 9 is a diagrammatical, cross-sectional illustration of the airbag system of FIGS. 6-7, in accordance with the first exemplary embodiment of the present disclosure.

Similar to FIGS. 3-4, FIGS. 9-10 diagrammatically illustrate different phases of inflation of the airbag cushion 120 after the pyrotechnic gas generating compound 130 was detonated and gas was generated within the cavity of the airbag cushion 120. As can be seen in FIG. 9, when the pyrotechnic gas generating compound 130 is initially ignited, gas 132 is created which fills the interior cavity 122 of the airbag cushion 120. This causes the central folded region 124 to separate, such that portions 126A and 126B are moved away from one another as the airbag material forming the central folded region 124 is pushed outwards. As shown in FIG. 4, the gas 132 may substantially fill the interior cavity 122 of the airbag cushion 120, such that the central folded region 124 is greatly minimized or eliminated. The eventual shape of the airbag cushion 120 may vary, depending on design, but in many cases it may have a substantially spherical or spheroid shape. While inflation occurs, a pressure relief structure 128 may start to open.

Figure 10:
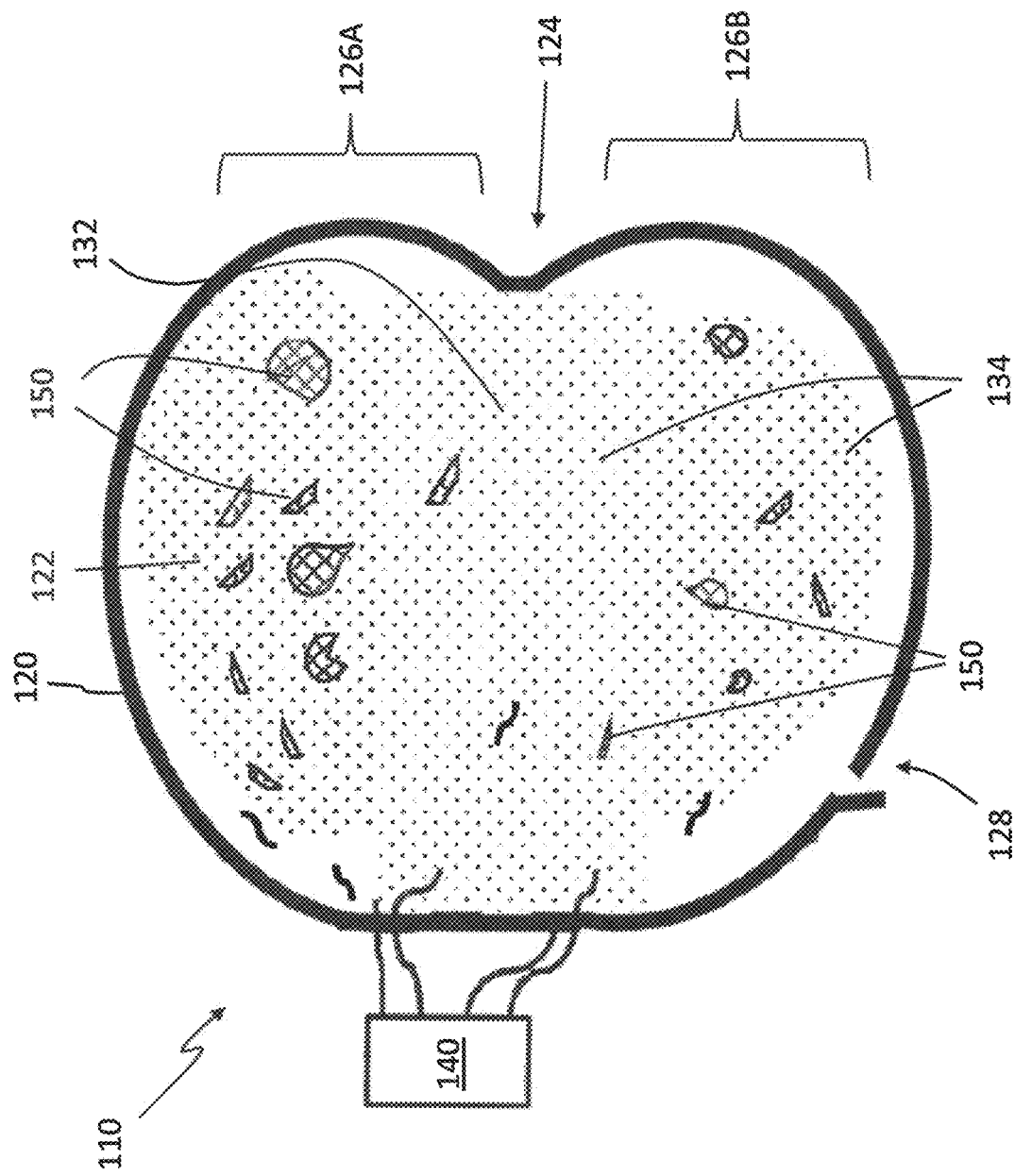
FIG. 10 is a diagrammatical, cross-sectional illustration of the airbag system of FIGS. 6-7, in accordance with the first exemplary embodiment of the present disclosure.

Since the electric circuit boards 144 are positioned within the interior cavity 122 of the airbag cushion 120, limiting or preventing the formation of shrapnel 150 within the interior cavity 122 of the airbag cushion 120 is desired. It may be desirable for the electric circuit board 144 sheets and other electronic parts to be made of materials that are powder, gel, liquid, or solid that burns up and/or that disintegrate into small enough particles during detonation such that the remnants of the electric circuit boards 144 and other materials do not form shrapnel that would threaten the integrity of the airbag cushion 120 fabric. Additionally, the interior cavity 122 of the airbag cushion 120 may contain glue or other material that secures the components of the device within the interior cavity 122. Preferably these materials are also made of powder, gel, liquid, or solid that burns up and/or that disintegrate into small enough particles during detonation that does not allow the disintegrated material to form shrapnel that would threaten the integrity of the airbag cushion fabric. FIGS. 9-10 illustrate fragments of the detonation that are small enough not to damage the reinforced wall of the airbag cushion 120 fabric.

The presence of the heat absorbing powder 130 or another heat absorbing or dispersing material made from any type of powder, gel, liquid, or solid may aid in ensuring remnants of the electric circuitry and wires are burnt up or disintegrated into small enough particles during detonation that does not allow the disintegrated material to form shrapnel that would threaten the integrity of the airbag cushion fabric. Additionally, a gas expansion slowing material made of materials that are powder, gel, liquid, and/or solid may be included in the interior cavity 122 to further ensure the prevention of shrapnel forming.

Figure 11:
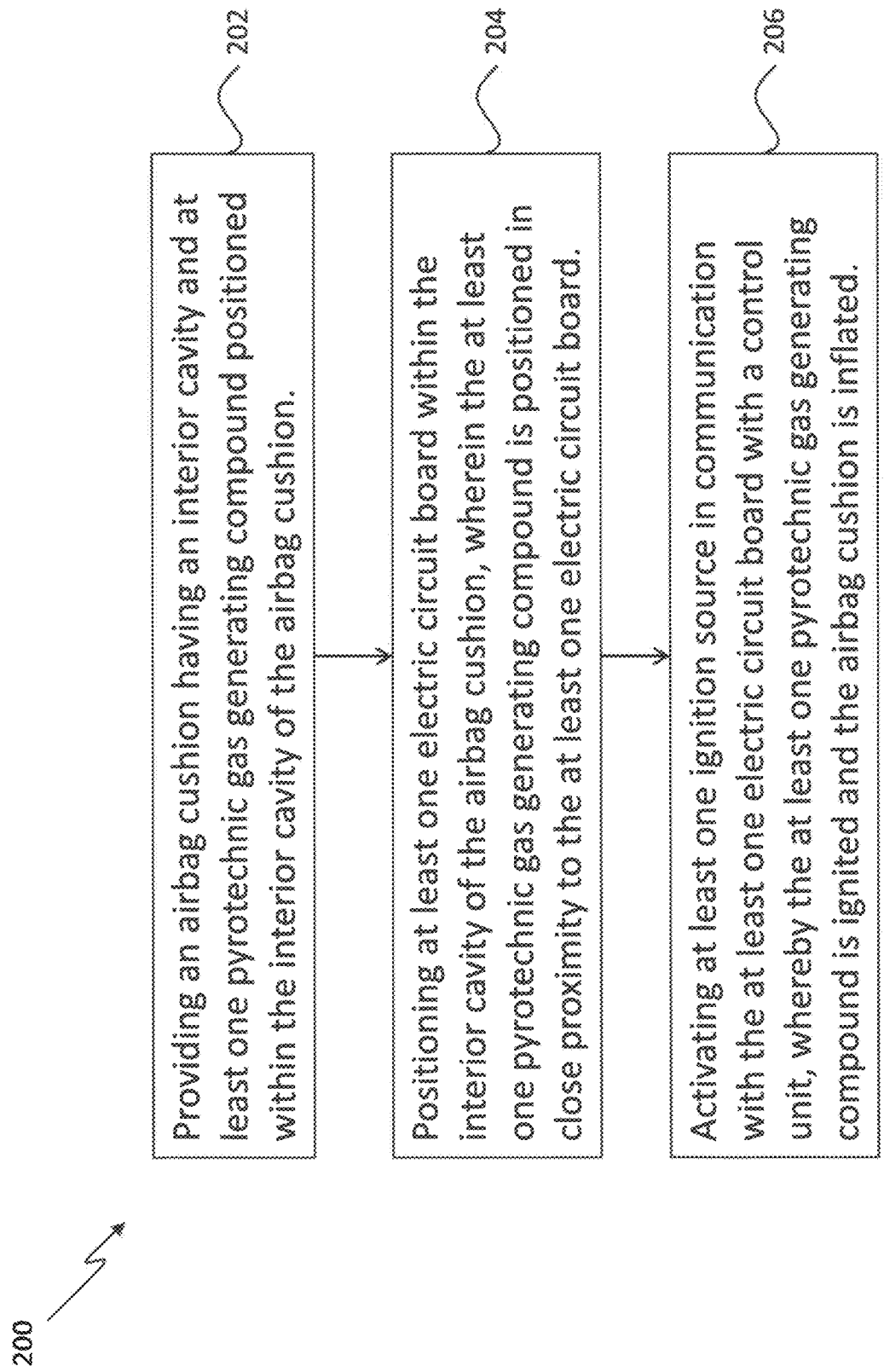
FIG. 11 is a flowchart illustrating a method of inflating an airbag, in accordance with the first exemplary embodiment of the present disclosure.

FIG. 11 is a flowchart illustrating a method of inflating an airbag, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, an airbag cushion has an interior cavity and at least one pyrotechnic gas generating compound positioned within the interior cavity of the airbag cushion. At least one electric circuit board is positioned within the interior cavity of the airbag cushion, wherein the at least one pyrotechnic gas generating compound is positioned in close proximity to the at least one electric circuit board (block 204). At least one ignition source in communication with the at least one electric circuit board is activated with a control unit, whereby the at least one pyrotechnic gas generating compound is ignited and the airbag cushion is inflated (block 206). The method may further include any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An airbag system comprising:
   an airbag cushion having an interior cavity;
   at least one pyrotechnic gas generating compound positioned within the interior cavity of the airbag cushion;
   at least one electric ignition source in communication with the at least one pyrotechnic gas generating compound, the at least one electric ignition source comprising;
      an electric power source;
      one or more electric circuit boards located within the interior cavity of the airbag cushion and positioned on substantially opposing sides of the at least one pyrotechnic gas generating compound, wherein an electric arc is transmitted between the one or more electric circuit boards through the at least one pyrotechnic gas generating compound; and
at least one wired connection between the electric power source and the one or more electric circuit boards; and
a control unit in communication with the at least one electric ignition source, wherein activation of the at least one electric ignition source by the control unit causes the at least one pyrotechnic gas generating compound to inflate the airbag cushion.

2. The airbag system of claim 1, wherein the at least one electric ignition source is positioned within the interior cavity of the airbag cushion.

3. The airbag system of claim 1, wherein the one or more electric circuit boards further comprises a thin polyethylene sheet having an adhesive-laced metallic foil.

4. The airbag system of claim 1, wherein the airbag cushion comprises:
an inner layer formed from a heat resistant material;
a middle layer formed from a material with low gas permeability; and
an outer layer formed from a material with high tensile strength.

5. The airbag system of claim 1, further comprising a heat-absorbing or heat dispersing material positioned within the interior cavity of the airbag cushion, wherein during ignition of the at least one pyrotechnic gas generating compound the heat-absorbing or heat dispersing material prevents a formation of shrapnel within the airbag cushion.

6. The airbag system of claim 1, wherein the airbag cushion has a central folded region with a first portion of the at least one pyrotechnic gas generating compound positioned on one side of the central folded region and a second portion of the at least one pyrotechnic gas generating compound positioned on a substantially opposite side of the central folded region.

7. The airbag system of claim 6, wherein the at least one pyrotechnic gas generating compound is a substantially flat structure positioned substantially parallel to the central folded region.

8. The airbag system of claim 1, further comprising at least one ignition source in addition to the at least one electric ignition source, wherein the at least one ignition source is in communication with the at least one pyrotechnic gas generating compound, wherein the at least one ignition source and the at least one electric ignition source are different ignition sources.

9. The airbag system of claim 8, wherein the at least one ignition source comprises at least one of:
a heat-generating ignition source;
a vibration ignition source; or
a laser ignition source.

10. The airbag system of claim 9, wherein the heat-generating ignition source further comprises:
a heat-generating source;
at least one electric circuit board positioned within the interior cavity of the airbag cushion and located substantially abutting the at least one pyrotechnic gas generating compound; and
at least one wired connection between an electric power source and the at least one electric circuit board, wherein activation of the heat-generating source heats at least a portion of the at least one electric circuit board to ignite the at least one pyrotechnic gas generating compound.

11. The airbag system of claim 9, wherein the vibration ignition source further comprises a vibration device positioned proximate to the at least one pyrotechnic gas generating compound, wherein activation of the vibration device transfers a vibration into the at least one pyrotechnic gas generating compound to ignite it.

12. The airbag system of claim 9, wherein the laser ignition source further comprises a laser diode and at least one optical wire, wherein a quantity of laser light is transmitted from the laser diode to the at least one pyrotechnic gas generating compound through the at least one optical wire to ignite the at least one pyrotechnic gas generating compound.

13. An airbag system comprising:
an airbag cushion having an interior cavity;
at least one pyrotechnic gas generating compound positioned within the interior cavity of the airbag cushion;
at least two electric circuit boards positioned within the interior cavity of the airbag cushion and positioned on substantially opposing sides of the at least one pyrotechnic gas generating compound, whereby the at least one pyrotechnic gas generating compound is positioned between the at least two electric circuit boards;
at least one ignition source in communication with the at least two electric circuit boards; and
a control unit in communication with the at least one ignition source, wherein activation of the at least one ignition source by the control unit causes an electric arc to be transmitted between the at least two electric circuit boards through the at least one pyrotechnic gas generating compound, thereby causing ignition of the at least one pyrotechnic gas generating compound, whereby the airbag cushion is inflated.

14. A method of inflating an airbag, the method comprising:
providing an airbag cushion having an interior cavity and at least one pyrotechnic gas generating compound positioned within the interior cavity of the airbag cushion;
positioning one or more electric circuit boards within the interior cavity of the airbag cushion and on substantially opposing sides of the at least one pyrotechnic gas generating compound; and
activating at least one electric ignition source in communication with the one or more electric circuit boards with a control unit, thereby transmitting an electric arc between the one or more electric circuit boards through the at least one pyrotechnic gas generating compound, whereby the at least one pyrotechnic gas generating compound is ignited and the airbag cushion is inflated.

15. The method of claim 14, wherein activating the at least one electric ignition source further comprises activating at least two electric ignition sources substantially simultaneously.

16. The method of claim 14, further comprising positioning the at least one electric ignition source within the interior cavity of the airbag cushion.

17. The method of claim 14, wherein the airbag cushion has a central folded region with a first portion of the at least one pyrotechnic gas generating compound positioned on one side of the central folded region and a second portion of the at least one pyrotechnic gas generating compound positioned on a substantially opposite side of the central folded region.

* * * * *